United States Patent
Deng

(10) Patent No.: US 10,860,884 B2
(45) Date of Patent: *Dec. 8, 2020

(54) METHODS AND APPARATUS TO DETERMINE THE DIMENSIONS OF A REGION OF INTEREST OF A TARGET OBJECT FROM AN IMAGE USING TARGET OBJECT LANDMARKS

(71) Applicant: The Nielsen Company (US), LLC, New York, NY (US)

(72) Inventor: Kevin Deng, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/282,060

(22) Filed: Feb. 21, 2019

(65) Prior Publication Data
US 2019/0188527 A1    Jun. 20, 2019

Related U.S. Application Data

(63) Continuation of application No. 15/258,325, filed on Sep. 7, 2016, now Pat. No. 10,235,585.

(Continued)

(51) Int. Cl.
*G06K 9/34* (2006.01)
*G06K 9/62* (2006.01)
*G06K 9/32* (2006.01)
*G06K 9/00* (2006.01)
*G06K 9/20* (2006.01)

(52) U.S. Cl.
CPC ........ *G06K 9/6211* (2013.01); *G06K 9/00456* (2013.01); *G06K 9/00463* (2013.01); *G06K 9/00483* (2013.01); *G06K 9/2063* (2013.01); *G06K 9/3233* (2013.01);
(Continued)

(58) Field of Classification Search
None
See application file for complete search history.

(56) References Cited

U.S. PATENT DOCUMENTS 5,528,290 A    6/1996    Saund
5,581,629 A    12/1996    Hanna et al.
(Continued)

OTHER PUBLICATIONS

United States Patent and Trademark Office, "Notice of Allowance," issued in connection with U.S. Appl. No. 15/258,325, dated Oct. 18 2018, 11 pages.

(Continued)

*Primary Examiner* — Feng Niu
(74) *Attorney, Agent, or Firm* — Hanley, Flight & Zimmerman, LLC

(57) ABSTRACT

Methods and apparatus to determine the dimensions of a region of interest of a target object and a class of the target object from an image using target object landmarks are disclosed herein. An example method includes identifying a landmark of a target object in an image based on a match between the landmark and a template landmark; classifying a target object based on the identified landmark; projecting dimensions of the template landmark based on a location of the landmark in the image; and determining a region of interest based on the projected dimensions, the region of interest corresponding to text printed on the target object.

20 Claims, 10 Drawing Sheets

Related U.S. Application Data

(60) Provisional application No. 62/320,881, filed on Apr. 11, 2016.

(52) U.S. Cl.
CPC . *G06K 2009/6213* (2013.01); *G06K 2209/01* (2013.01); *G06T 2207/30176* (2013.01)

(56) References Cited

U.S. PATENT DOCUMENTS

| | | | |
|---|---|---|---|
| 5,742,263 A | 4/1998 | Wang et al. | |
| 5,832,100 A | 11/1998 | Lawton et al. | |
| 6,009,212 A | 12/1999 | Miller et al. | |
| 6,553,152 B1 | 4/2003 | Miller et al. | |
| 6,565,003 B1 | 5/2003 | Ma | |
| 6,688,525 B1 | 2/2004 | Nelson et al. | |
| 7,519,200 B2 | 4/2009 | Gokturk et al. | |
| 7,884,958 B2 | 2/2011 | Otsuka et al. | |
| 8,237,971 B2 | 8/2012 | Otsuka et al. | |
| 8,577,118 B2 | 11/2013 | Nepomniachtchi et al. | |
| 8,590,794 B2 | 11/2013 | Wang et al. | |
| 8,649,572 B2 | 2/2014 | Gokturk et al. | |
| 8,787,695 B2* | 7/2014 | Wu | G06K 9/00442 382/266 |
| 8,839,121 B2* | 9/2014 | Bertolami | G06F 3/011 715/757 |
| 8,897,505 B2 | 11/2014 | Gokturk et al. | |
| 8,983,170 B2 | 3/2015 | Nepomniachtchi et al. | |
| 9,014,432 B2 | 4/2015 | Fan et al. | |
| 9,158,744 B2 | 10/2015 | Rao et al. | |
| 9,239,952 B2 | 1/2016 | Hsu et al. | |
| 9,290,022 B2 | 3/2016 | Makabe | |
| 9,298,964 B2 | 3/2016 | Li et al. | |
| 9,298,979 B2 | 3/2016 | Nepomniachtchi et al. | |
| 9,324,073 B2 | 4/2016 | Nepomniachtchi et al. | |
| 9,384,389 B1 | 7/2016 | Sankaranarayanan et al. | |
| 9,684,842 B2 | 6/2017 | Deng | |
| 9,710,702 B2 | 7/2017 | Nepomniachtchi et al. | |
| 9,721,185 B2* | 8/2017 | Li | G06K 9/4604 |
| 9,747,504 B2 | 8/2017 | Ma et al. | |
| 9,824,270 B1 | 11/2017 | Mao | |
| 9,927,337 B2* | 3/2018 | Kombolias | G01N 3/08 |
| 10,235,585 B2* | 3/2019 | Deng | G06K 9/2063 |
| 2006/0232619 A1 | 10/2006 | Otsuka et al. | |
| 2006/0251339 A1 | 11/2006 | Gokturk et al. | |
| 2009/0196510 A1 | 8/2009 | Gokturk et al. | |
| 2010/0287485 A1* | 11/2010 | Bertolami | G06F 3/011 715/764 |
| 2011/0052075 A1 | 3/2011 | Comay et al. | |
| 2011/0091092 A1 | 4/2011 | Nepomniachtchi et al. | |
| 2011/0122443 A1 | 5/2011 | Otsuka et al. | |
| 2011/0182508 A1 | 7/2011 | Ives et al. | |
| 2012/0109689 A1 | 5/2012 | Lee | |
| 2012/0183211 A1 | 7/2012 | Hsu et al. | |
| 2012/0274953 A1 | 11/2012 | Makabe | |
| 2013/0094695 A1 | 4/2013 | He et al. | |
| 2013/0121589 A1 | 5/2013 | Gokturk et al. | |
| 2013/0148862 A1 | 6/2013 | Roach et al. | |
| 2013/0170741 A9 | 7/2013 | Hsu et al. | |
| 2013/0223721 A1 | 8/2013 | Nepomniachtchi et al. | |
| 2013/0287265 A1 | 10/2013 | Nepomniachtchi et al. | |
| 2013/0294652 A1 | 11/2013 | Fan et al. | |
| 2014/0099001 A1 | 4/2014 | Nepomniachtchi et al. | |
| 2014/0140635 A1* | 5/2014 | Wu | G06K 9/00442 382/266 |
| 2014/0195891 A1 | 7/2014 | Venkata Radha Krishna Rao et al. | |
| 2014/0301645 A1 | 10/2014 | Mattila | |
| 2015/0076229 A1 | 3/2015 | Hamamura et al. | |
| 2015/0169951 A1 | 6/2015 | Khintsitskiy et al. | |
| 2015/0317528 A1 | 11/2015 | Nepomniachtchi et al. | |
| 2016/0003722 A1* | 1/2016 | Kombolias | G01N 3/08 73/827 |
| 2016/0012195 A1 | 1/2016 | Lee | |
| 2016/0133002 A1 | 5/2016 | Rhee et al. | |
| 2016/0203388 A1* | 7/2016 | Li | G06T 7/73 386/241 |
| 2016/0246302 A1 | 8/2016 | Liao et al. | |
| 2016/0283787 A1 | 9/2016 | Nepomniachtchi et al. | |
| 2017/0270508 A1 | 9/2017 | Roach et al. | |
| 2017/0293819 A1 | 10/2017 | Deng | |

OTHER PUBLICATIONS

ABBYY, "ABBYY FineReader Engine 11," © 2013, ABBYY Production LLC., 4 pages.

Nshuti, "Mobile Scanner and OCR (A first step towards receipt to spreadsheet)," Jun. 6, 2015, https://web.stanford.edu/class/ee368/Project_Spring_1415/Reports/Nshuti.pdf, 5 pages.

O'Gorman et al., "Document Image Analysis," IEEE Computer Society Executive Briefings, ISBN 0-8186-7802-X, Library of Congress No. 97-17283, 1997, 125 pages.

Papusha et al., "Hough Transform for Directional Orientation," Stanford Department of Electrical Engineering, Spring 2010, 5 pages.

Wikipedia, "Hough Transform," https://en.wikipedia.org/w/index.php?title=Hough_transform&oldid=713919571, Apr. 6, 2016, 9 pages.

Solberg, "INF 4300—Hough transform," Oct. 21, 2009, 20 pages.

Stack Overflow, "Algorithm to detect corners of paper sheet in photo," http://stackoverflow.com/questions/6555629/algorithm-to-detect-corners-of-paper-sheet-in-photo, 2011, 12 pages.

Fisher et al., "Hough Transform," http://homepages.inf.ed.ac.uk/rbf/HIPR2/hough.htm, 2003, 12 pages.

Lazebnik,"Fitting: The Hough transform," lecture, http://www.cs.unc.edu/~lazebnik/spring09/lec09_hough.pdf, Spring 2009, 52 pages.

Kavalerov, "Using Pattern Recognition to Automatically Crop Framed Art," Sep. 24, 2014, http://artsy.github.io/blog/2014/09/24/using-pattern-recognition-to-automatically-crop-framed-art/, 5 pages.

United States Patent and Trademark Office, "Non-Final Office Action," issued in connection with U.S. Appl. No. 15/258,325, dated Feb. 20, 2018, 17 pages.

United States Patent and Trademark Office, "Final Office Action," issued in connection with U.S. Appl. No. 15/258,325, dated Jul. 17, 2018, 17 pages.

* cited by examiner

METHODS AND APPARATUS TO DETERMINE THE DIMENSIONS OF A REGION OF INTEREST OF A TARGET OBJECT FROM AN IMAGE USING TARGET OBJECT LANDMARKS

CROSS REFERENCE TO RELATED APPLICATIONS

This Patent arises from a patent application that claims priority to U.S. patent application Ser. No. 15/258,325, filed on Sep. 7, 2016, entitled "METHODS AND APPARATUS TO DETERMINE THE DIMENSIONS OF A REGION OF INTEREST OF A TARGET OBJECT FROM AN IMAGE USING TARGET OBJECT LANDMARKS," which claims priority to U.S. Provisional Patent Application Ser. No. 62/320,881, filed on Apr. 11, 2016, entitled "Receipt Lifter." Priority to U.S. patent application Ser. No. 15/258,325 and U.S. Provisional Patent Application Ser. No. 62/320,881 is claimed. The entirety of U.S. Provisional Patent Application Ser. No. 62/320,881 and U.S. patent application Ser. No. 15/258,325 are incorporated herein by reference in their entirety.

FIELD OF THE DISCLOSURE

This disclosure relates generally to image processing, more particularly, to methods and apparatus to determine the dimensions of a region of interest of a target object from an image using target object landmarks.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
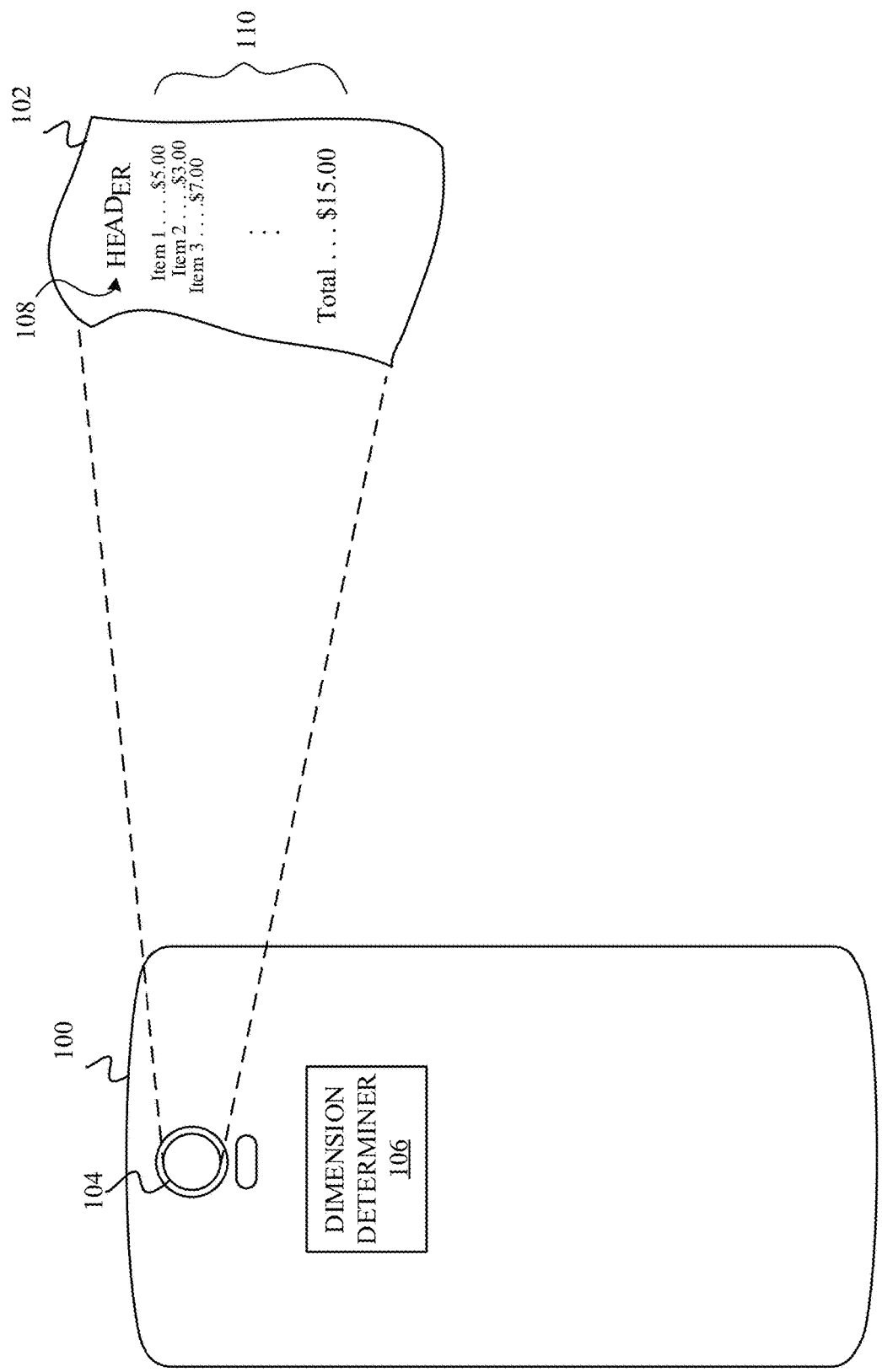
FIG. 1 illustrates example dimension determiner to determine dimensions of a region of interest of an example target object.

Manual text extraction involves a human reviewing an image of a document (or a paper copy of the document) and manually typing the text associated with that document. Manual extraction has a high level of accuracy, but can be cost prohibitive and time consuming. Optical character recognition (OCR) is a technique to automatically detect, identify, and encode image-based text documents using a computer. While using OCR to extract text is typically faster and cheaper than manual extraction, OCR is less accurate and more prone to error. Furthermore, the accuracy of OCR techniques diminishes when the original image including text to be extracted is of poor quality. For example, while an OCR engine may be able to recognize the clearly printed text of a magazine article imaged using a flatbed scanner with a relatively high level of accuracy, the same OCR engine may be much less accurate in recognizing the text on a receipt imaged using a camera in connection with, for example, different (e.g., poor) lighting conditions, crumpledness and/or optical distortions of the receipt, the receipt does not lay flat, and/or the captured image cuts off the corners of the receipt. Accurately determining the dimensions of text of a target object in an image increases the accuracy of OCR techniques, thereby reducing the cost associated with manual review to correct for errors. Examples disclosed herein provide an improved accuracy determination of the dimensions of a region of interest of target object (e.g., corresponding to region of text in the target object) than conventional techniques.

Additionally, examples disclosed herein may determine the categories of a target object. As used herein, categories are defined as the sources of the receipts represented by their headers, footers or bar codes. The header and/or footer are usually presented as graphic design that is beyond any OCR capability. Without loss of generality, the header and/or footer presented as some text can also be treated as a graphic design. Examples disclosed herein also provide a determination of their categories.

Conventional techniques to determine text of a target object from an image include transforming sub-regions of an image onto a rectified target object by identifying the corners of the target object directly or indirectly through comparing the target object to the background of the image. However, such conventional techniques exhibit difficulty and/or are not able to identify corners. When a direct technique is used, the corners are often confused with many corner-like elements naturally presented in the image. In some examples, when the corners are not well formed or imaged, it is impossible to determine the corners of a target object. When an indirect technique is used (e.g., using boundary detection), detecting corners may be difficult or impossible when (a) the background of the captured image includes boundary-like elements, confusing with the true boundaries, (b) the background is substantially similar to the target object, making the true boundary less visible or invisible (e.g., the background has text/font similar to that of the target object, the background has an intensity similar to that of the paper of a target), (c) the target object is crumpled or misshaped, making the boundary curved instead of straight (d) shadows are present in the captured image, generating false boundaries and/or (e) the boundary(s) of the target object are not within the image. Examples disclosed herein determine a region of interest of a target object and a class of the target object (e.g., a company corresponding to the target object) based on identifying and locating a landmark in the target object. The identification of the landmark determines the class of the landmark while the location of the landmark provides a reference for determination of boundaries of the landmark, and eventually the corners of the landmark. Identifying the region of interest based on the landmark of the target object is an indirect technique. It alleviates the problems that arise by conventional indirect techniques of identifying the boundaries of the target object based on a comparison of the target object to the background because the boundaries are determined with referenced transition points instead of all transition points when they are available, and are implied when the transition points are not available or not formed in a straight line. Examples disclosed herein identify the dimensions of a region of interest of a target object using landmarks (e.g., headers, footers, barcodes, advertisements, etc.). Landmarks are independent of the background and resilient to noise (e.g., due to printing quality, camera quality, and/or imaging conditions), thereby increasing the accuracy and/or efficiency of text extraction from captured images. In some examples, the identified landmark is also used to determine its class based on a class corresponding to a matched template landmark.

Additionally, conventional techniques perform an OCR process to determine if a target object is one of interest. For example, such conventional techniques may perform OCR to identify an address and/or phone number of a company of interest. If identified addresses and/or phone numbers do not correspond to a company of interest, the image is discarded, wasting memory and processing resources associated with the OCR process. Examples disclosed herein identify a landmark object before the memory and/or processor intensive OCR process occurs. Examples disclosed herein identify a class associated with the target object based on a template landmark that matches the identified landmark. In this manner, example disclosed herein can discard images that do not correspond to a company of interest based on the class prior to the OCR process, thereby saving processor and/or memory resources. Additionally, examples disclosed herein removes the need for a map between a store(s) and addresses and/or phone numbers corresponding to the store(s), thereby reducing cost and memory resources associated with additional storage structures.

Examples disclosed herein receive an image and determine if a target object within the image includes a landmark. The landmark is a graphic design that is printed on the target object. For example, if the target object is a receipt, a landmark may be a header corresponding to a company's name and/or logo, a footer corresponding to a company's name and/or logo, or on-object landmark corresponding to an on-receipt promotion, a bar code, a Quick Response (QR) code, a watermark, etc. Examples disclosed herein compare the received and/or otherwise captured image to template landmarks stored in one or more storage device(s) and/or database(s) to determine if the received image includes a landmark (e.g., an imaged landmark). As used herein, a template landmark is a previously stored landmark. The template landmark is also marked based on its purpose, such as header, footer, bar-code, or promotion. In some examples, the template landmark corresponds to a class (e.g., if the example landmark is a logo, the class is the company associated with the logo). Thus, when the template landmark is matched to an imaged landmark, the class of the imaged landmark is identified. The template landmark is used as truth data and an imaged landmark is a landmark presented in a received image. When a received image includes an imaged landmark, examples disclosed herein locate the imaged landmark, determine its class, and determine whether the landmark is a header, footer, or on-object landmark based on the template landmark's mark. The type of landmark determines how examples disclosed herein proceed in determining the dimensions of the target object. More specifically, the template landmark predicates where the true transition point may be, excludes some of the false transition points when a boundary is imaged, and provides a default boundary when the boundary is not imaged or is invisible. The predication makes it possible to determine the region of interest independent of the scale and the orientation.

As discussed in further detail below in connection with FIGS. 8A-8F, examples disclosed herein project the template landmark onto the imaged landmark of the image using an image overlaying process to generate a left side search area (LSSA) and a right side search area (RSSA) based on the location of the template landmark. The example LSSA and RSSA corresponds to a restricted search range in direction and area. Examples disclosed herein process the LSSA and the RSSA to identify a left side edge of the imaged landmark and a right side edge of the imaged landmark using detected transition points and a Hough Transform. In some examples, a first corner of the region of interest is determined based on an intersection between the left side imaged landmark edge and a bottom or top edge of the imaged template landmark and a second corner of the region of interest is determined based on an intersection between the right side imaged landmark edge and the bottom or top edge of the imaged template landmark.

Examples disclosed herein determine a left side edge of the target object by generating multiple candidate edge lines within a left side search area using Hough line detection method, as even a curved line can be approximated with straight line within a small section such as within the left side search area. The left side edge of the target object corresponds to the line among the multiple candidate edge lines that has the highest normalized transition point count. Examples disclosed herein determine a right side edge of the target object by generating multiple candidate edge lines within a right side search area using Hough line detection method, as even a curved line can be approximated with straight line within a small section such as within the right side search area. The right side edge of the target object corresponds to the line among the multiple candidate edge lines that has the highest normalized transition point count.

Once the right side edge and the left side edge of the imaged landmark are determined, examples disclosed herein determine a third corner and a fourth corner of the region of interest. Examples disclosed herein approximate the left side edge with a straight line by selecting a line among all lines starting at the first detected corner and ending at an image boundary with an angle between the imaged landmark left side greater than −SA and less than SA, where SA is a predetermined constant. Examples disclosed herein select the line corresponding to the largest number of the transition points per unit length. The right side edge is determined similarly, except that the starting point is the second detected corner. Additionally, examples disclosed herein compute all dark-to-bright transition points in an area defined by a line N pixels away from the bottom of the detected landmark, the detected left side, the detected right side, and the boundary of the image. Once the dark-to-bright transition points are computed, examples disclosed herein use a Hough transform to find a line furthest from the bottom of the imaged landmark, with an orientation $O_e$, such that $|O_e-O_l|<Threshold_o$, where $O_l$ is the orientation of the bottom of the imaged landmark. Examples disclosed herein determine the third corner of the region of interest based on an intersection between the right edge and the lowest text line. Additionally, examples disclosed herein determine the fourth corner of the region of interest based on an intersection between the left edge and the lowest text line. When the landmark is something else (e.g., an on-object landmark, a footer, etc.), the examples may be altered to incorporate different geometric constraints to determine corners of a target object. With the corners detected, there are many methods that can be used to rectify the region defined by the corners into an image as if the imaged were scanned.

Examples disclosed herein effectively remove distortions caused by the imaging process, providing a better image to any OCR system, thereby increasing the accuracy and efficiency of extraction (e.g., text extraction) from images.

FIG. 1 illustrates an example imaging device 100 capturing an image of an example target object 102. The example imaging device 100 includes an example camera 104 and an example dimension determiner 106. The example target object 102 includes an example landmark 108 and example text 110.

The example imaging device 100 of FIG. 1 is a device capable of capturing an image. In the illustrated example, the imaging device 100 is a mobile device (e.g., a cell phone, a tablet, a 2in1, etc.). Alternatively, the imaging device 100 may be a scanner, a web cam, a computer, a laptop, a digital camera, a three-dimensional sensor, and/or any device that includes a camera or sensor. The example imaging device 100 includes the example camera 104. In the illustrated example of FIG. 1, the example camera 104 captures an image of all or part of the example target object 102.

The example target object 102 of FIG. 1 is an object that includes text (e.g., the example text 110) that may be recognized by text recognition software (e.g., OCR). In the illustrated example of FIG. 1, the target object 102 is a receipt. Alternatively, the target object 102 may be any object that includes text. The example target object 102 includes the landmark 108 and the text 110. Although the example landmark 108 is a header, the example landmark 108 may be a footer, an on-target image landmark (e.g., barcode, advertisement, etc.), and/or any other type of landmark. Examples disclosed herein process an image of the example target object 102 and use the example landmark 108 to increase the accuracy and of text recognition of the example text 110. In some examples, the image may be processed in a backend office.

Once an image of the target object 102 of FIG. 1 has been captured, the example camera 104 and/or another device may filter and/or pre-process the received image. Additionally, the camera 104 and/or other device transmits the image to the example dimension determiner 106. The dimension determiner 106 retrieves and/or otherwise receives the captured image and processes the captured image to identify the example landmark 108 by comparing the landmark 108 to one or more stored template landmarks. The dimension determiner 106 determines a region of interest of the target object 102 by identifying corners (e.g., four corners) corresponding to the example text 110 based on the example landmark 108, as further described in conjunction with FIG. 2. In some examples, the example landmark 108 is processed to indicate the class of the target object. For example, when the target object 102 is a store receipt, the class of the target object may be a store name. Once the dimension determiner 106 determines the corners of region of interest the target object 102 (e.g., corresponding to the example text 110), the dimension determiner 106 transmits the dimension data and/or any other extracted data to another process for text recognition. Although the example dimension determiner 106 is included in the illustrated imaging device 100 of FIG. 1, the example dimension determiner 106 may be located at a remote location. If the dimension determiner 106 is located a remote location, the example imaging device 100 may provide captured images to the dimension determiner 106 via a wired or wireless connection (e.g., via a network connection).

Figure 2:
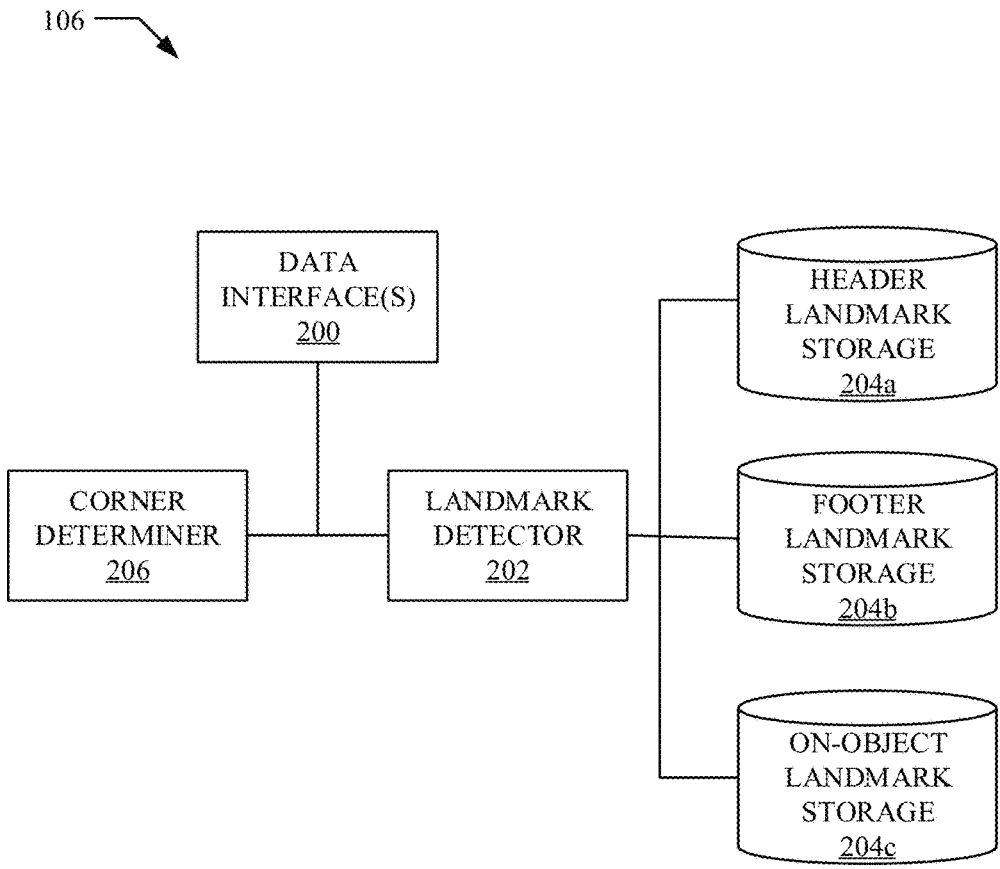
FIG. 2 is a block diagram of the example dimension determiner of FIG. 1.

FIG. 2 is a block diagram of the example dimension determiner 106 of FIG. 1 disclosed herein, to determine the corners (e.g., four corners) of a region of interest of the target object 102 of FIG. 1. While the example dimension determiner 106 is described in conjunction with the example imaging device 100 and the example target object 102 (FIG. 1), the example dimension determiner 106 may be utilized to determine corners of any target object captured by any imaging device. The example dimension determiner 106 includes an example data interface(s) 200, an example landmark detector 202, an example header landmark storage 204a, and an example footer landmark storage 204b, an example on-object landmark storage 204c, and an example corner determiner 206.

The example data interface(s) 200 of FIG. 2 receives and/or otherwise retrieves captured images from the example camera 104 (FIG. 1). In some examples, the example data interface(s) 200 interfaces with another device (e.g., a user interface) to communicate with a user when a landmark has not been found in the image, a manual intervention is needed, and/or any other error occurred. Additionally, the example data interface(s) 200 may serve as a control center to manage the whole system.

The example landmark detector 202 of FIG. 2 identifies and locates landmarks in the captured image of the example target object 102. In some examples, the landmark detector 202 uses planar object detection to compare parts of the captured image to template landmarks stored in the landmark storage (e.g., the example header landmark storage 204a, the example footer landmark storage 204b, and/or the example on-object landmark storage 204c). Alternatively, any type of image processing may be used to determine a match between a captured (e.g., imaged) landmark and a template (e.g., truth) landmark. The identified landmark is used to indicate the target's class (e.g., based on the class of the matched template landmark) and the location of the landmark is used to determine a left side search area, a right side search area of the template landmark, the top of the landmark, and the bottom of the landmark. As further described below, the example corner determiner 206 uses the LSSA and the RSSA to determine a first and second corner of the target object 102. Additionally, the example landmark detector 202 may determine that the imaged landmark is partially cut-off (e.g., the image does not include a portion of the landmark). In some examples, in response to determining that the landmark is cut-off, or no landmark is identified, the landmark detector 202 prompts data interface 200 for manual interventions. Such manual interventions include discarding the image, confirming a weak detection or classification, defining a boundary manually, and/or harvesting a new landmark template. In some examples, the landmark detector 202 determines a class of an imaged landmark based on the class associated with a matched template landmark. In such examples, when the landmark detector 202 determines that the class of the imaged landmark is not of interest, the example landmark detector 202 may prevent further processing of the received image, thereby conserving processor and/or memory resources associated with processing the image and/or OCRing the image. In this manner, examples disclosed herein do not need to generate and/or store mappings between a company and addresses and/or phone numbers associated with the company.

The example storage devices 204a-c of FIG. 2 store template landmarks corresponding to previously scanned or captured landmarks of target objects of interest. The example storage devices 204a-c may be updated to include additional collected landmarks from target objects at any time. The stored landmarks may include additional data corresponding to the target object 102. For example, the additional data may include data corresponding to class (e.g., the entity that generated the target object) of the target object 102, a format (e.g., layout) of the target object 102, a type of landmark (e.g., header, footer, on-object, etc.), etc. In this manner, when a template landmark is matched to an imaged landmark, the example landmark detector 202 can determine a class of an imaged landmark based on the class corresponding to the template landmark. The example header landmark storage 204a stores template header landmarks, the example footer landmark storage 204b stores template footer landmarks, and the example on-object landmark storage 204c stores on-object landmarks (e.g., barcodes, advertisements, watermarks etc.) In some examples, the header landmark storage 204a, the footer landmark storage 204b, and/or the on-object landmark storage 204c may be combined into one storage device (e.g., a single database). In some examples, the storage devices 204a-c may be located in a remote location. In such examples, the landmark detector 202 may communicate with the storage devices 204a-c via a wired or wireless connection. In some examples, when the landmark detector 202 cannot detect a landmark, the landmark detector 202 may instruct the data interface(s) 200 to send an error message to a user identifying the problem (e.g., via a user interface).

The example corner determiner 206 of FIG. 2 determines corners (e.g., four corners) for a region of interest of the example target object 102 based on the imaged landmark detected by the example landmark detector 202. In some examples, such as when the landmark is an on-object landmark, the example corner determiner 206 may determine eight corners of a region of interest. For example, the corner determiner 206 may (A) determine the first four corners of the a first region of interest for text above the on-object landmark (e.g., in a manner substantially similar to determining four corners of a footer landmark) and (B) determine an additional four corners of a second region of interest for text below the on-object landmark (e.g., in a manner sustainably similar to determining four corners of a header landmark), or (C) determine the top two corners above the on-object landmark and the bottom two corners below the on-object landmark to construct the desired four corners.

The example corner determiner 206 of FIG. 2 generates an LSSA and an RSSA to identify a first (e.g., left side) and second (e.g., right side) edge of the imaged landmark based on vertical transition points. A vertical transition point is a point whose intensity is substantially different (e.g., based on one or more threshold(s)) from a neighboring point (e.g., Abs(C(x,y)−C(x+n,y))>T1 and Abs(C(x+n,y)−C(x+n,m,y))<T2 for some point (x,y) where C(x,y) is the intensity (C) at location (x,y), n and m are integers corresponding to neighboring points, and T1 and T2 are threshold values). In some examples, if the LSSA or the RSSA is entirely outside the captured image, the corner determiner 206 may instruct the data interface(s) 200 to send an error message to a user identifying the problem (e.g., via a user interface). Because the LSSA and the RSSA are relatively small regions (e.g., restricted range in direction and area) compared to the total captured image, the accuracy of identifying the edge as a line increases, regardless of whether the edges of the target object 102 are not substantially straight. The example corner determiner 206 determines the first and second corner based on an intersection of a bottom or top edge of the located (e.g., matched) template landmark and the left side and the right side detected in LSSA, and RSSA, respectively, as the top and bottom edge detection is much more reliable than that of the left and the right. For example, if the imaged landmark is a header, the example corner determiner 206 may determine a first corner based on the bottom edge of the located template landmark and the computed left side within LSSA. If the imaged landmark is a footer, the example corner determiner 206 may determine a first corner based on the top edge of the template landmark and computed left side within RSSA Once the example corner determiner 206 of FIG. 2 determines the landmark sides and the first and second corners of the target object 102, the example corner determiner 206 projects (e.g., extends) the landmark sides toward the top of the image (e.g., for a footer/on-object landmark) and/or the bottom of the image (e.g., for a header/on-object landmark) to determine the third and fourth corners of the target object 102. Because the target object 102 may not be straight, the projected landmark edge may not be the best representation of the edge of the target object 102. Thus, the example corner determiner 206 generates one or more alternate target object edge lines within a threshold range of the projected landmark edge to identify the best representation of the edge of the target object 102. The example corner determiner 206 determines the optimal edge (e.g., best estimation of the actual target object edge) for the left and right side of the target object 102 based on the generated target object edge line with the highest normalized transition point count.

The example corner determiner 206, for each candidate side line, calculates a number of horizontal dark-to-bright transition points (HTP) within a neighborhood of the candidate line. An HTP indicates where a printed character ends. The example corner determiner 206 make a point (x,y) as an HTP point if C(x,y+n)−C(x,y)>T3 and C(x,y+n)−C(x,y+n+m))<T4 where C(x,y) is the intensity (C) at location (x,y), n and m are integers corresponding to neighboring points, and T2 and T3 are threshold values. A candidate side is a line starting at detected corners extending until the image boundary with an orientation deviating from the corresponding side line no more than a predetermined constant SA. Among all candidate lines, a line associated with the largest number of HTS per unit is selected as a side line best approximating the true boundary of the target object 102. When the number of HTS per unit is smaller than some predetermined threshold, the extension of the detected sides of the located landmark may be used to approximate the boundary. The example corner determiner 206 determines the third and fourth corners of the target object 102 based on an intersection between the object edges and the lowest text line (e.g., for a header) or the highest text line (e.g., for a footer), as further described in conjunction with FIG. 7. In some examples (e.g., when such sides cannot be determined satisfactorily), the corner determiner 206 instructs the data interface(s) 200 to interface with a user for manual confirmation or intervention.

While example manners of implementing the example dimension determiner 106 of FIG. 1 are illustrated in conjunction with FIG. 2, elements, processes and/or devices illustrated in conjunction with FIG. 2 may be combined, divided, re-arranged, omitted, eliminated and/or implemented in any other way. Further, the example data interface(s) 200, the example landmark detector 202, the example header landmark storage 204a, the example footer landmark storage 204b, the example on-object landmark storage 204c, the example corner determiner 206, and/or, more generally, the example dimension determiner 106 of FIG. 2 may be implemented by hardware, machine readable instructions, software, firmware and/or any combination of hardware, machine readable instructions, software and/or firmware. Thus, for example, any of the example data interface(s) 200, the example landmark detector 202, the example header landmark storage 204a, the example footer landmark storage 204b, the example on-object landmark storage 204c, the example corner determiner 206, and/or, more generally, the example dimension determiner 106 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface(s) 200, the example landmark detector 202, the example header landmark storage 204a, the example footer landmark storage 204b, the example on-object landmark storage 204c, the example corner determiner 206, and/or, more generally, the example dimension determiner 106 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example dimension determiner 106 of FIG. 2 include elements, processes and/or devices in addition to, or instead of, those illustrated in conjunction with FIGS. 3-7, and/or may include more than one of any or all of the illustrated elements, processes and devices.

Flowcharts representative of example machine readable instructions for implementing the example dimension determiner 106 of FIG. 2 are shown in conjunction with FIGS. 3-7. In the examples, the machine readable instructions comprise a program for execution by a processor such as the processor 912 shown in the example processor platform 900 discussed below in connection with FIG. 9. The program may be embodied in machine readable instructions stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in conjunction with FIGS. 3-7, many other methods of implementing the example dimension determiner 106 of FIG. 2 may alternatively be used. For example, the order of execution of the blocks may be changed, and/or some of the blocks described may be changed, eliminated, or combined. Although the flowcharts of FIGS. 3-7 depict example operations in an illustrated order, these operations are not exhaustive and are not limited to the illustrated order. In addition, various changes and modifications may be made by one skilled in the art within the spirit and scope of the disclosure. For example, blocks illustrated in the flowchart(s) may be performed in an alternative order or may be performed in parallel.

As mentioned above, the example processes of FIGS. 3-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

Figure 3:
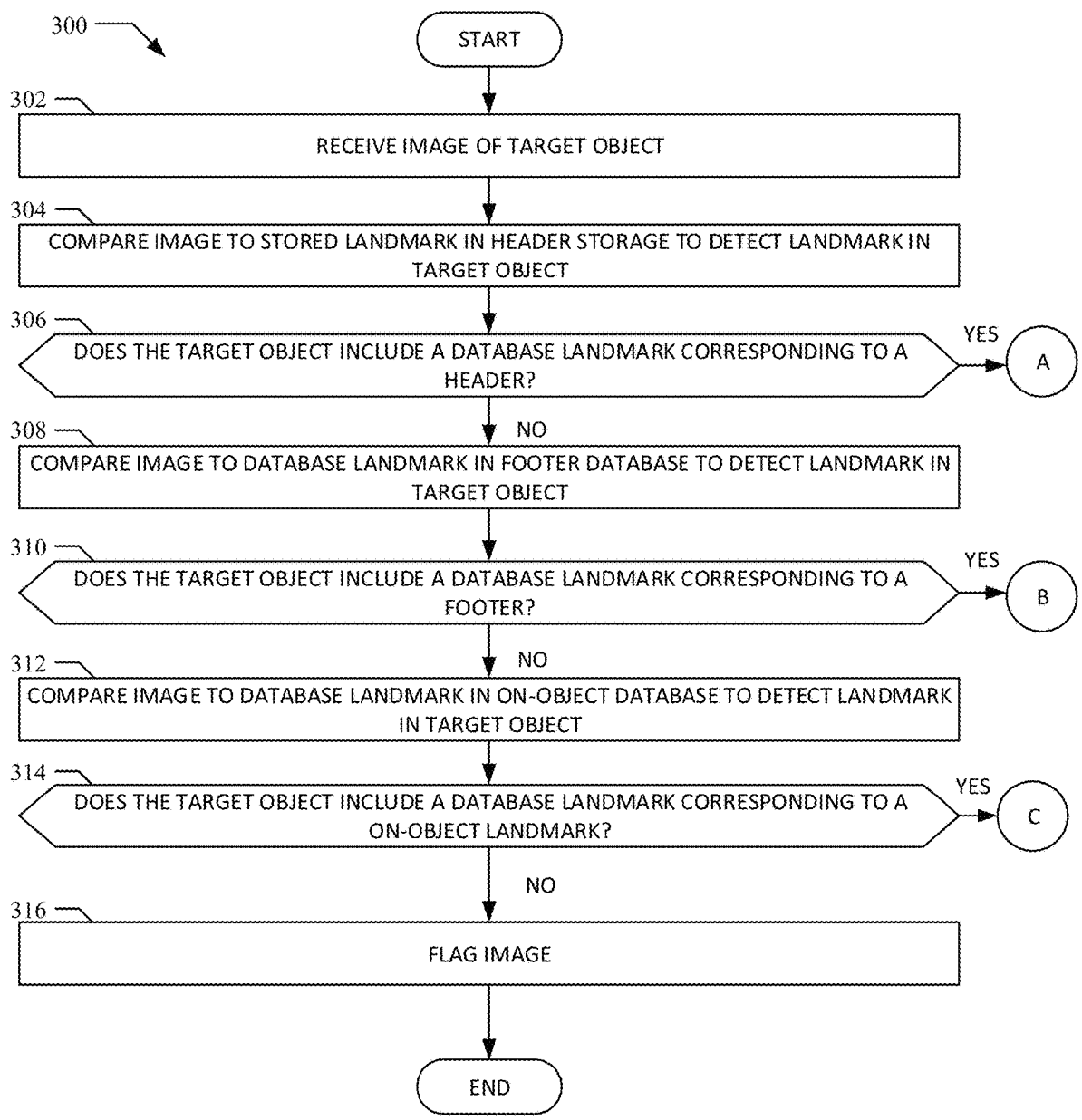
FIGS. 3-7 are flowcharts representative of example machine readable instructions that may be executed to implement the example dimension determiner of FIGS. 1 and/or 2 to determine the dimensions of the region of interest and/or categories of the example target object of FIG. 1.
Figure 8A:
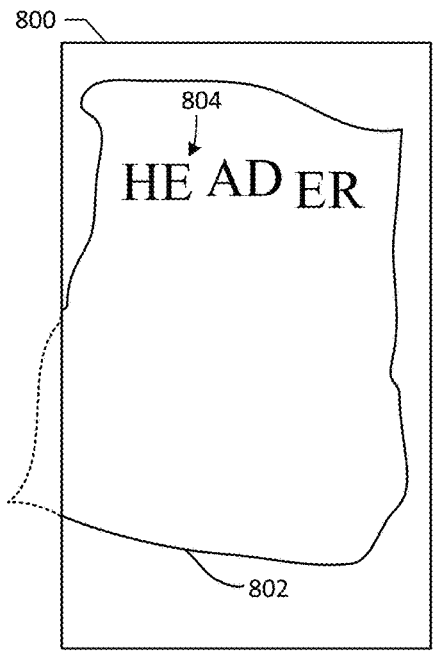
FIGS. 8A-8F illustrate an example image associated with an example process used by the example dimension determiner of FIGS. 1 and/or 2 to determine the dimensions of the region of interest of the example target object of FIG. 1.

FIG. 3 is an example flowchart 300 representative of example machine readable instructions that may be executed to implement the example dimension determiner 106 of FIGS. 1 and 2 to determine corners (e.g., four corners) of interest corresponding to the corners of the target object 102 of FIG. 1. The example flowchart 300 is described in conjunction with an example image 800 as a shown in FIG. 8A. The example captured image of FIG. 8A includes an example target object 802. The example target object 802 may correspond to the example target object 102 and/or any target object. FIG. 8A includes the example image 800, the example target object 802, and an example imaged landmark 804. Although the example of FIG. 8A illustrates techniques for determine corners (e.g., four corners) of a region of interest for the target object 802 based on the example landmark 804 being a header, similar techniques may be utilized to determine four corner (e.g., or two sets of four corners) based on the example landmark 804 being a footer and/or an on-object landmark.

At block 302, the example interface(s) 200 (FIG. 2) receives and/or otherwise retrieves the example image 800 of the example target object 802. As illustrated in the example image 800 of FIG. 8A, the target object 802 includes one corner that is outside of (e.g., cut-off from) the image 800. The example target object 802 of FIG. 8A includes the example imaged landmark 804, which is a header landmark. At block 304, the example landmark detector 202 (FIG. 2) compares the image 800 (e.g., a part of the example image 800) to one or more stored template landmarks in the example header landmark storage 204a (FIG. 2) to detect the example imaged landmark 804 in the example target object 802. At block 306, the example landmark detector 202 determines if the target object 802 includes a landmark corresponding to a template header landmark based on the comparison.

Figure 4:
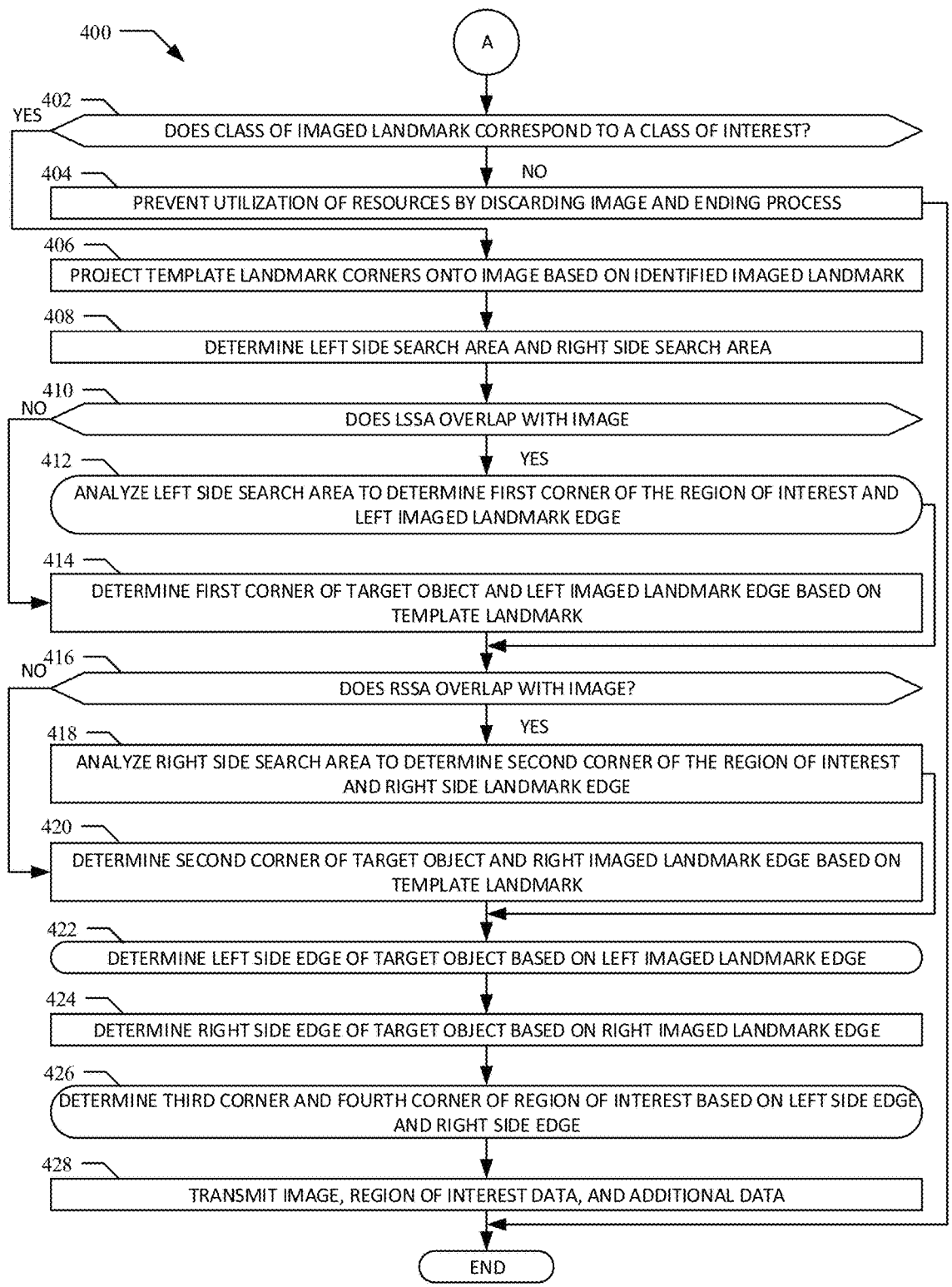

If the example landmark detector 202 determines that the target object 802 includes a database landmark corresponding to a template header landmark (block 306), the process continues to process 'A,' which is further described in conjunction with FIG. 4. If the example landmark detector 202 determines that the target object 802 does not include a landmark corresponding to a template header landmark (block 306), the example landmark detector 202 compares the image 800 to the stored landmarks in the example footer landmark storage 204b (FIG. 2) to detect the example imaged landmark 804 in the example target object 802 (block 308). Alternatively, the example landmark detector 202 may determine that the target object 802 includes a header landmark that is cut-off. In such examples, the landmark detector 202 may continue to search for an additional landmark (e.g., a footer landmark or an on-object landmark) that is not cut-off the example image 800.

At block 310, the example landmark detector 202 determines if the target object 802 includes a landmark corresponding to a template footer landmark based on the comparison. If the example landmark detector 202 determines that the target object 802 includes a footer landmark (block 310), the example process continues to process 'B.' Process 'B' is a similar process to process 'A,' but in a different direction. For example, process 'A' identifies the first two corners (e.g., upper corners) based on the template header and determines the last two corners (e.g., lower corners) accordingly. In contrast, Process 'B' identifies the first two corners (e.g., lower corners) based on the template footer and determines the last two corners (e.g., upper corners) accordingly, using a substantially similar process as Process 'A.' If the example landmark detector 202 determines that the target object 802 does not includes a footer landmark (block 310), the example landmark detector 202 compares the image 800 to the stored landmarks in the example on-object landmark storage 204c (FIG. 2) to detect the example imaged landmark 804 in the example target object 802 (block 312).

At block 314, the example landmark detector 202 determines if the target object 802 includes a landmark corresponding to an on-object template landmark based on the comparison. If the example landmark detector 202 determines that the target object 802 includes an on-object landmark, the example process continues to process 'C.' Process 'C' is a similar process to process 'A' and 'B', operating in both directions (e.g., up and down from the landmark). For example, process 'C' may identify two sets of four corners, the first set in a process similar to process 'A' and the second set in the process similar to process 'B.' In this manner, the target object 802 is processed both above and below the on-object landmark. Alternatively, process 'C' may use process 'A' to obtain the lower corners of the example target object 802 and may use process 'B' to obtain the upper corners of the target object 802.

If the landmark detector 202 determines that the target object 802 does not include an on-object landmark, the example landmark detector 202 flags the example image 800 (block 316). The flag may include transmitting instructions to the example data interface(s) 200 to send an error message to a user of the imaging device 100 (FIG. 1). For example, the landmark detector 202 may identify an error in the image (e.g., a message identifying that one or more portions of the object is missing) and request the user to capture an additional image (e.g., a request to capture an image with an alternate orientation) of the target object 802.

Figure 8B:
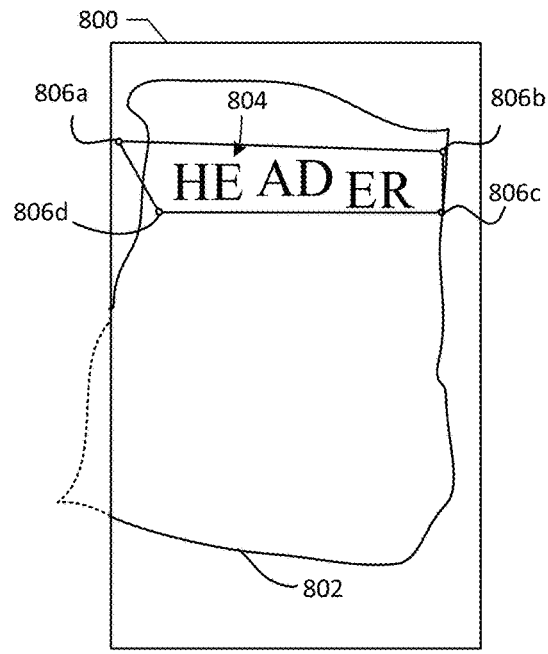
Figure 8C:
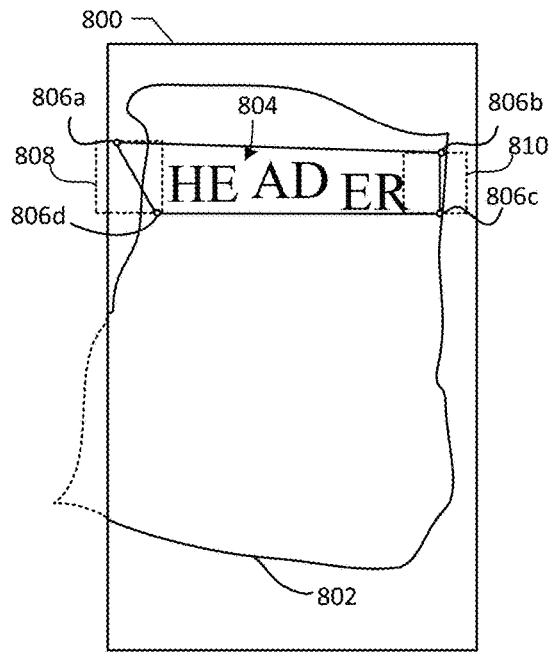
Figure 8D:
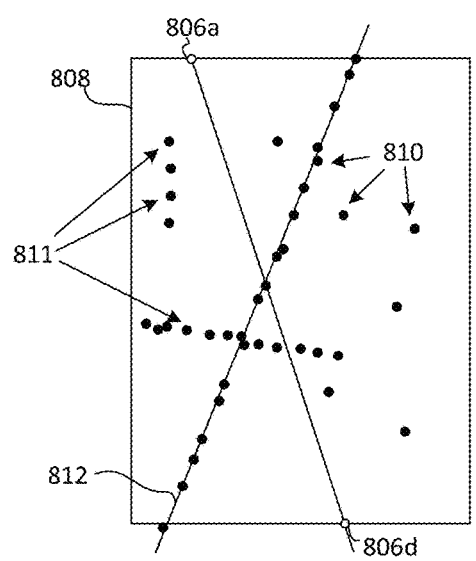
Figure 8F:
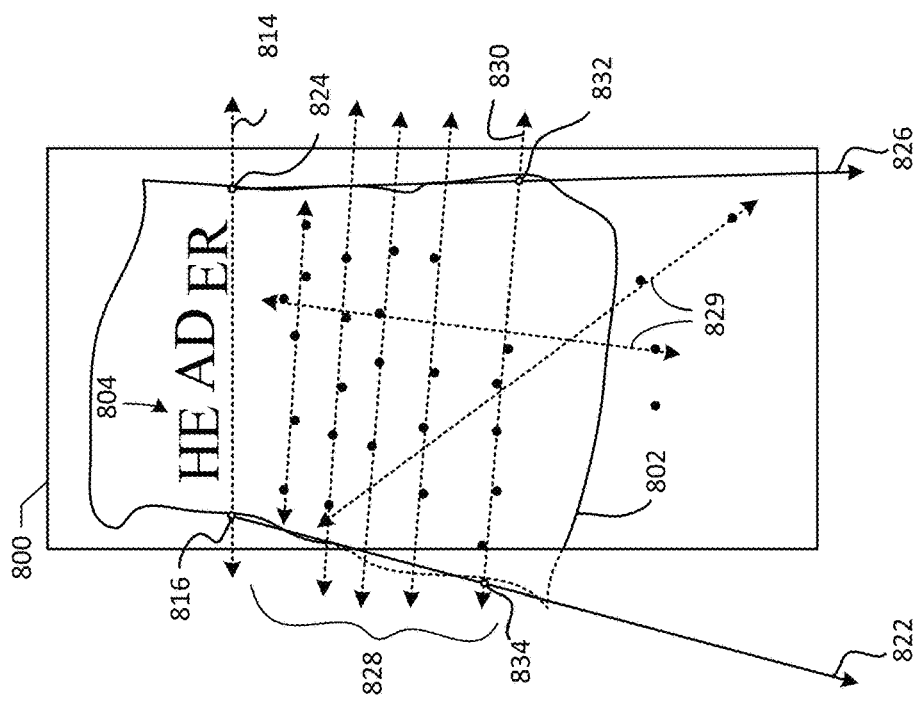
Figure 8E:
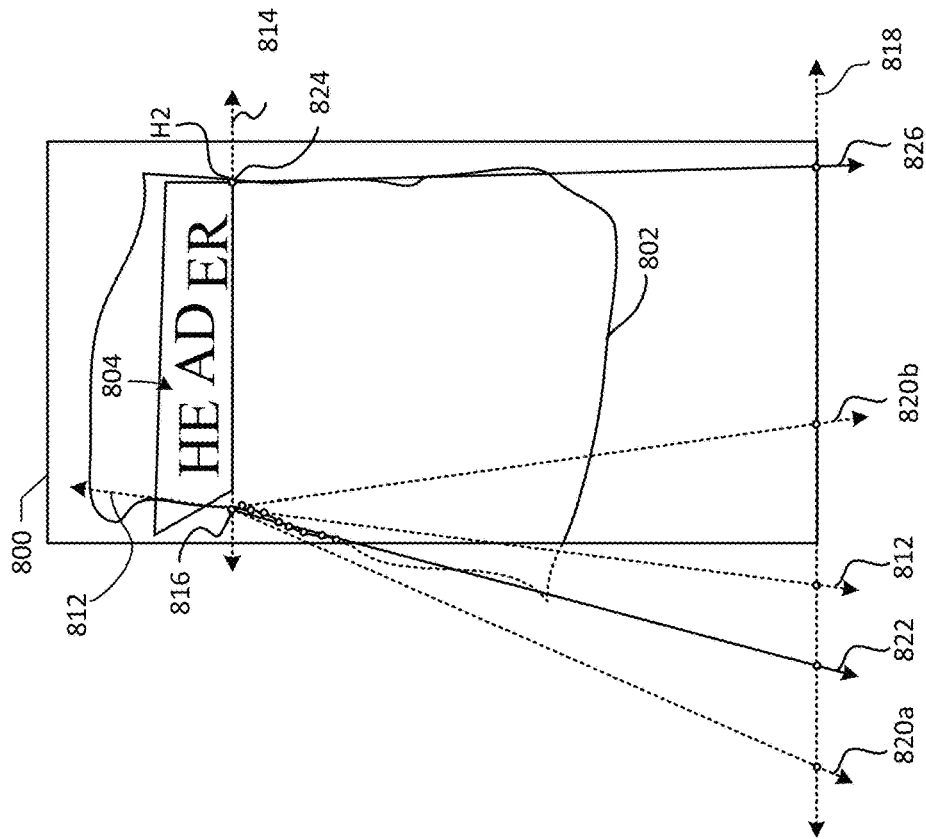

FIG. 4 is an example flowchart 400 representative of example machine readable instructions that may be executed to implement the example dimension determiner 106 of FIGS. 1 and 2 to determine the corners (e.g., four corners) corresponding to a region of interest of the example target object 802. The example flowchart 400 is described in conjunction with the example image 800 as a shown in FIGS. 8B-8F. FIG. 8B includes the example image 800, the example target object 802, and the example landmark 804 of FIG. 8A and example matched template landmark corners 806a-d. FIG. 8C includes the example image 800, the example target object 802, the example landmark 804, and example matched template landmark corners 806a-d of FIG. 8B, an example LSSA 808 and an example RSSA 810. FIG. 8D is an example of the LSSA 808 of FIG. 8C. The example LSSA 808 includes the example matched template landmark corners 806a, 806d of FIG. 8C, example vertical transition points 811, and an example imaged landmark edge 812. FIG. 8E includes the example the example image 800, the example target object 802, the example landmark 804, and example matched template landmark corners 806a-d of FIG. 8B, the example imaged landmark edge 812 of FIG. 8C, an example matched template landmark bottom edge 814, an example first corner 816, an example bottom image line 818, example edge limit lines 820a, 820b, an example left side edge 822, an example second corner 824, and an example right side edge 826. FIG. 8F includes the example image 800, the example target object 802, the example landmark 804, the example matched template landmark bottom edge 814, the example first corner 816, the example bottom image line 118, the example left side edge 822, the example second corner 824, the example right side edge 826 of FIG. 8E, example text lines 828, example error text lines 829, an example third corner 832, and an example fourth corner 834. Although the examples of FIGS. 8B-F illustrate techniques for determine corners of the target object 802 based on the example landmark 804 being a header, similar techniques may be utilized to determine four corner (e.g., or two sets of four corners) based on the example landmark 804 being a footer and/or an on-object landmark.

At block 402, the example landmark detector 202 determines if the imaged landmark 804 corresponds to a class of interest. As described above, the example landmark detector 202 may identify a class of the imaged landmark 804 based on a class corresponding to the matched template landmark. If the class is not a class of interest, then the example landmark detector 202 determines that there is no need to perform any further identification because the information within the image 800 is not of interest. If the class of the imaged landmark does not correspond to a class of interest (block 402), the example landmark detector 202 prevents utilization of resources (e.g., processor resources and/or memory resources associated with identifying the corners and/or OCRing the image 800) by discarding the image 800 and ending the processes (block 404).

At block 406, the example corner determiner 206 (FIG. 2) projects (e.g., overlays) the example matched template landmark corners 806a-d onto the example image 800 based on the identified imaged landmark 804 of FIG. 8B. For example, the corner determiner 206 transforms (e.g., matches) a corresponding template landmark and matches the transformed template landmark onto the imaged landmark 804 to project the example matched template landmark corners 806a-d when the imaged landmark is matched to a landmark template. The landmark corners correspond to the dimensions of the corresponding matched template landmark transformed to the dimensions of the imaged landmark 804. At block 408, the example corner determiner 206 determines the example LSSA 808 and the example RSSA 810 of FIG. 8C based on the matched template landmark. The LSSA 808 is centered around the left edge of the matched template landmark and the RSSA 810 is centered around the right edge of the matched template landmark. In some examples, the height and the width of the LSSA 808 and/or RSSA 810 correspond to the length and width of the matched template landmark (e.g., represented by the matched template landmark corners 806a-d). For example, the height of the LSSA 808 may be substantially similar to the height of the matched template landmark and the width of the LSSA 808 may be a fraction (e.g., a quarter) of the width of the matched template landmark. Alternatively, any scalar may be used to generate the dimensions of the LSSA 808 and/or RSSA 810.

At block 410, the example corner determiner 206 determines if the LSSA 808 overlaps (e.g., at least partially overlaps) the example image 800. If the example LSSA 808 overlaps the example image 800 (e.g., is at least partially included in the example image 800) (block 410), the example corner determiner 206 analyzes the example LSSA 808 to determine a first corner (e.g., the example first corner 816 of FIG. 8E) of the region of interest and the left example imaged landmark edge 812 (FIGS. 8D and 8E) of the imaged landmark 804 (block 412), as further described in conjunction with FIG. 5. If the example LSSA 808 does not overlap the example image 800 (e.g., is completely outside the example image 800) (block 410), the example corner determiner 206 determines the first corner of the target object 802 and a first (e.g., left) imaged landmark edge of the example imaged landmark 804 based on the matched template landmark (block 414). The example corner determiner 206 may determine the first corner and the first imaged landmark edge of the target object 802 based on the example first matched template landmark corner 806a (FIG. 8C), example fourth matched template landmark corner 806d (FIG. 8C), and/or any other point within the example LSSA 808.

At block 416, the example corner determiner 206 determines if the RSSA 810 overlaps (e.g., at least partially overlaps) the example image 800. If the example RSSA 810 overlaps the example image 800 (block 416), the example corner determiner 206 analyzes the example RSSA 810 to determine a second corner (e.g., the example second corner 824 of FIG. 8E) and the example right side edge 826 of the imaged landmark 804 (block 418). If the example RSSA 810 does not overlap the example image 800 (block 416), the example corner determiner 206 determines the second corner of the target object 802 and a second (e.g., right) imaged landmark edge of the example imaged landmark 804 based on the matched template landmark (block 420). The example corner determiner 206 may determine the second corner and the second (e.g., right) landmark edge of the target object 802 based on the example second matched template landmark corner 806b (FIG. 8C), based on the example third matched template landmark corner 806c (FIG. 8C), and/or based on any other point within the example RSSA 810.

At block 422, the example corner determiner 206 determines the example left side edge 822 of the example target object 802 (FIG. 8E) based on the first (e.g., left) imaged landmark edge, as further described in conjunction with FIG. 6 and described in further detail below. At block 424, the example corner determiner 206 determines the example right side edge 826 of the example target object 802 (FIG. 8E) based on the second (e.g., right) imaged landmark edge. At block 426, the example corner determiner 206 determines the example third corner 832 and the example fourth corner 834 of the region of interest of the target object 802 based on the example left side edge 822 and the example right side edge 826, as further described in conjunction with FIG. 7. At block 428, the example interface(s) 200 transmits the image, the region of interest data (e.g., including the example corners 816, 824, 832, 834 of FIG. 8F), and additional data (e.g., data related to the landmark) to a device for further processing, including but not limited to OCR.

Figure 5:
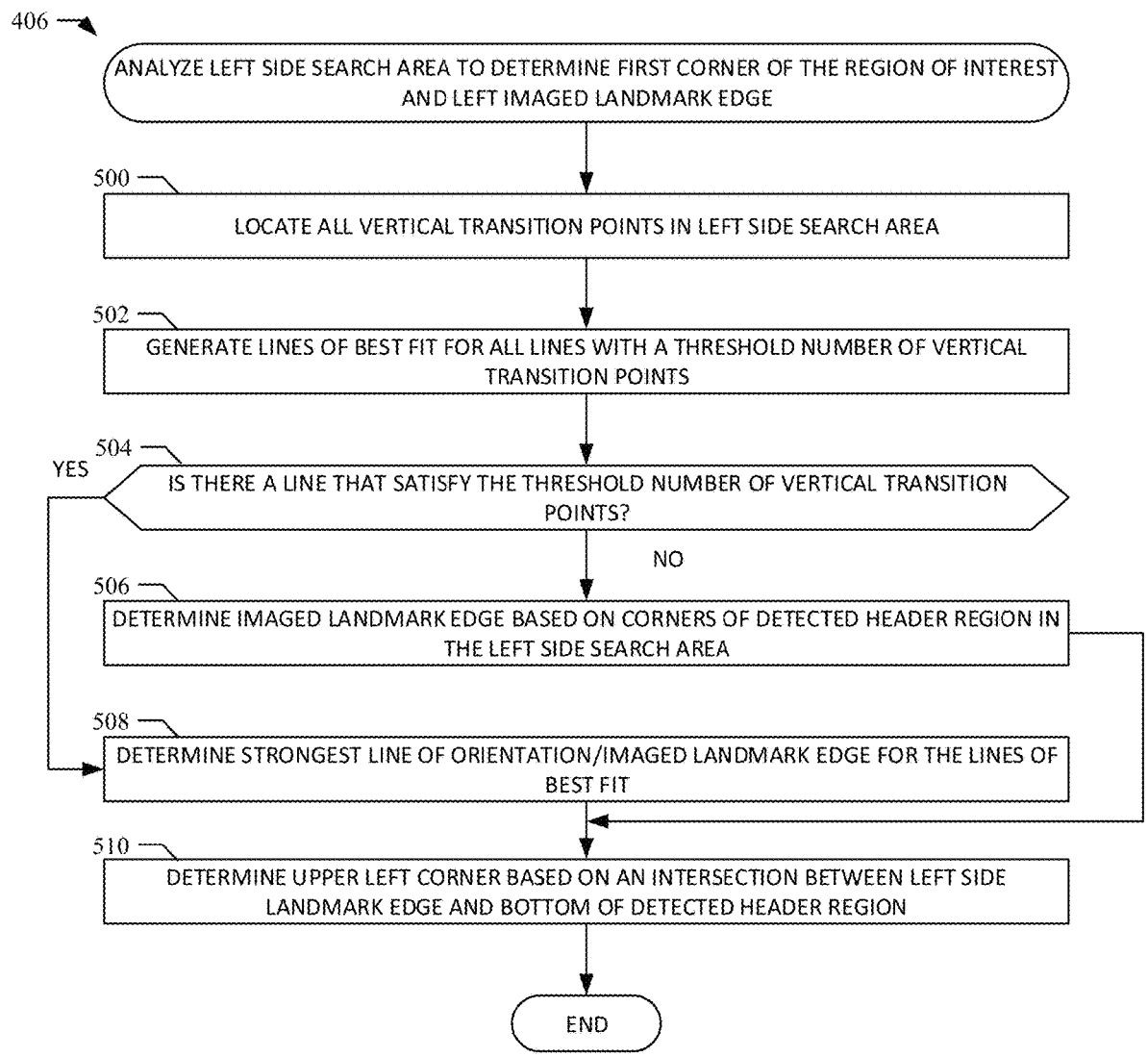

FIG. 5 is an example flowchart 412 representative of example machine readable instructions that may be executed to implement the example dimension determiner 106 of FIGS. 1 and 2 to analyze the example LSSA 808 to determine the example left side edge 822 and the first example corner 816 of the region of interest of the example target object 802. The example flowchart 412 of FIG. 5 is described in conjunction with FIGS. 8D and 8E.

At block 500 of the illustrated example of FIG. 5, the example corner determiner 206 (FIG. 2) locates all of the example vertical transition points 811 of FIG. 8F in the example LSSA 808. As described above in conjunction with FIG. 2, the example vertical transition points 811 are points having an intensity that varies more than a threshold amount from a neighboring point (e.g., $Abs(C(x,y)-C(x+n,y))>T1$ and $Abs(C(x+n,y)-C(x+n+m,y))<T2$ for some point (x,y) where C(x,y) is the intensity (C) at location (x,y), n and m are integers corresponding to neighboring points, and T1 and T2 are threshold values). At block 502, the example corner determiner 206 generates lines of best fit for all lines with a threshold number of vertical transition points. For example, if the threshold is five points, then the example corner determiner 206 generates all lines include more than five substantially linear vertical transition points. In some examples, the example corner determiner 206 determines the lines using a Hough transform. In some examples, the example corner determiner 206 removes any lines that are not within a threshold angle range corresponding to an angle of the matched template landmark. For example, if the orientation of a line is more than a threshold angle (e.g., 30 degrees) different from the orientation of the matched template landmark, the line is discarded.

At block 504 of the illustrated example of FIG. 5, the example corner determiner 206 determines if there is a line in the example LSSA 808 that satisfies a threshold number of vertical transition points. If there is not a line that satisfies the threshold number of vertical transition points, the example corner determiner 206 determines an imaged landmark edge based on the example matched template landmark corners 806a, 806d (block 506). In the illustrated example of FIG. 8D, the line defined with 806a and 806d is denoted as the reference line. If there is a line that satisfies the threshold number of vertical transition points, the example corner determiner 206 determines a strongest line of orientation as the imaged landmark edge. The strongest line of orientation is the line that fits with the most vertical transition points (block 508) and whose orientation does not deviate from that of the reference line more than some predefined threshold value. In the illustrated example of FIG. 8D, the strongest line of orientation is the example imaged landmark edge line 812. At block 510, the example corner determiner 206 determines the example first corner 816 (FIG. 8E) based on an intersection between the imaged landmark edge line 812 and the example matched template landmark bottom edge 814.

Figure 6:
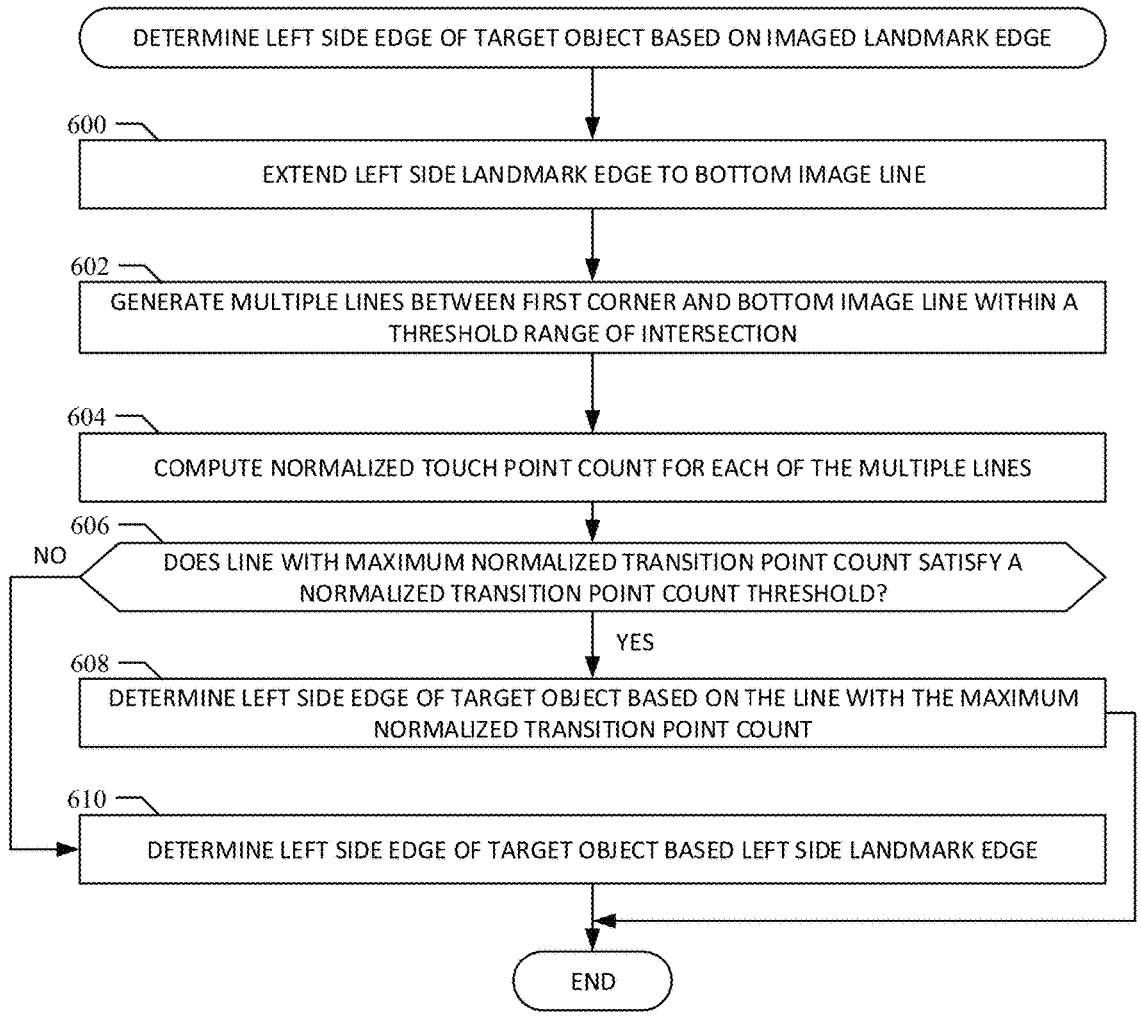

FIG. 6 is an example flowchart 422 representative of example machine readable instructions that may be executed to implement the example dimension determiner 106 of FIGS. 1 and 2 to determine the example left side edge 822 of the example target object 802 based on the example imaged landmark edge 812. The example flowchart 422 of FIG. 6 is described in conjunction with FIG. 8E.

At block 600, the example corner determiner 206 (FIG. 2) extends the example imaged landmark edge 812 to the example bottom image line 818. At block 602, the example corner determiner 206 searches lines between the example first corner 816 and points between example edge limit lines 820a, 820b on the example bottom image line 818. The first example edge limit line 820a is the intersection point between the bottom image line 818 and the line starting at the example first corner 816 with an orientation $S_a$ degrees clockwise away from the of the reference line. The second example edge limit line 820b is the intersection point between the example bottom image line 818 and the line starting at the example first corner 816 with an orientation $S_a$ degrees counter-clockwise away from that of the reference line. In the illustrated example of FIG. 8E, the threshold range is represented by the example edge limit lines 820a, 820b.

At block 604, the example corner determiner 206 computes a normalized transition point count for each of the multiple lines (e.g., represented by the open circles of FIG. 8E). When a transition point lies in the neighborhood of one of the multiple lines, the count associated with the line is increased by one. The total of such points is divided by the length of the line to obtain the normalized transition point count. The line with the highest normalized transition point count corresponds to the best estimation of the left side edge 822. At block 606, the example corner determiner 206 determines if the line with the maximum normalized transition point count satisfies a normalized transition point count threshold. If the example corner determiner 206 determines that there is at least one line that satisfies the normalized transition point count threshold, the example corner determiner 206 determines the example left side edge 822 of the example target object 802 based on the line with the maximum normalized transition point count (e.g., the example left side edge 822) (block 608). If the example corner determiner 206 determines that there are not any lines that satisfy the normalized transition point count threshold, the example corner determiner 206 determines a left imaged edge of the example target 802 to correspond to the imaged landmark edge 812 (block 610).

Figure 7:
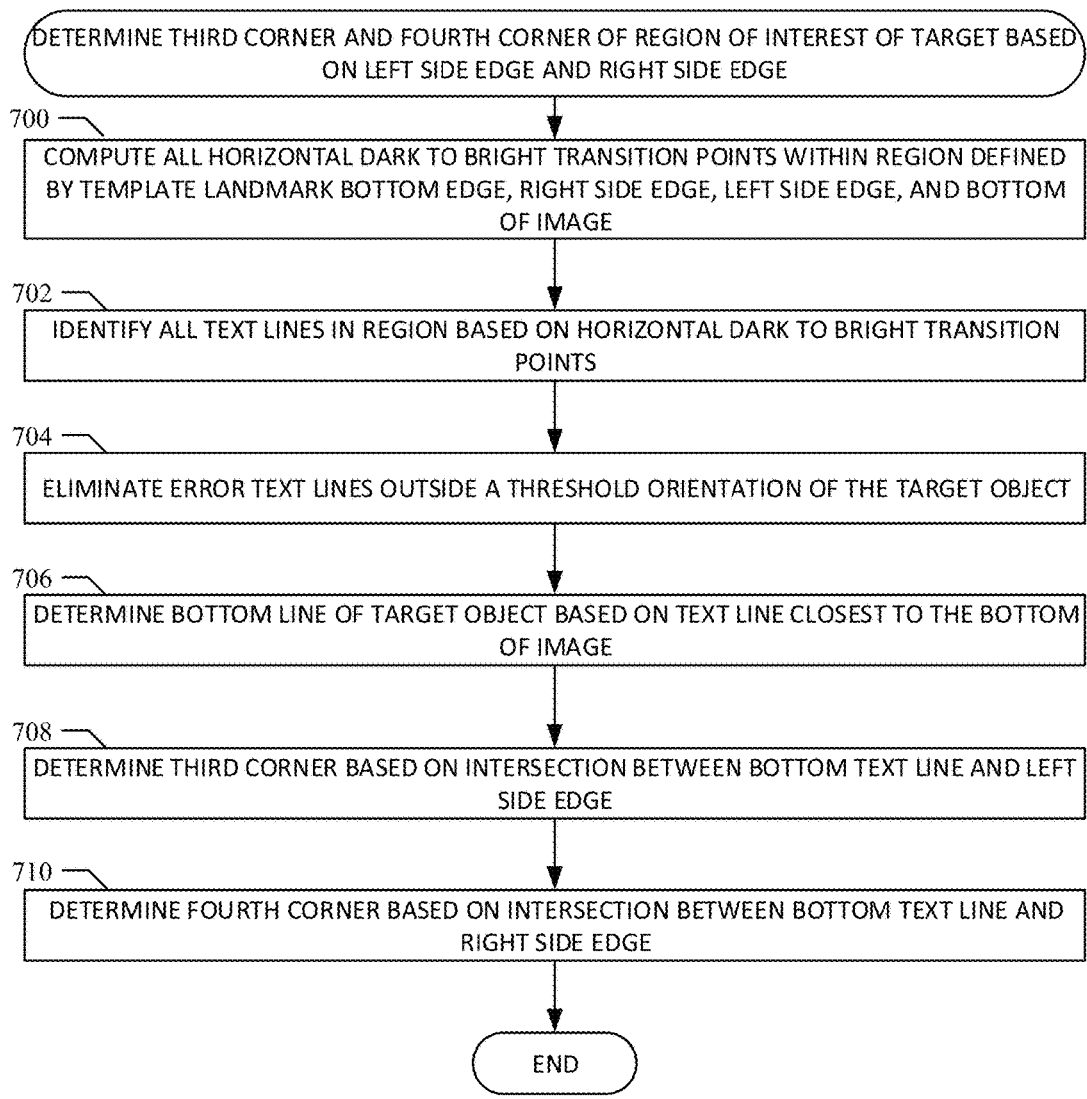

FIG. 7 is an example flowchart 426 representative of example machine readable instructions that may be executed to implement the example dimension determiner 106 of FIGS. 1 and 2 to determine the example third corner 832 and the example fourth corner 834 of the region of interest of the example target object 802 based on the example left side edge 822 and the example right side edge 826. The example flowchart 426 of FIG. 7 is described in conjunction with FIG. 8F.

At block 700, the example corner determiner 206 computes all the example vertical dark-to-bright transition points (e.g., represented by the dots in FIG. 8F) within a region defined by the example matched template landmark bottom edge 814, the example right side edge 826, the example left side edge 822, and the example bottom image line 818. As described above in conjunction with FIG. 2, the example corner determiner 206 computes the vertical dark-to-bright transition points to determine where text ends vertically (e.g., $C(x,y+n)-C(x,y)>T3$ and $C(x,y+n)-C(x,y+n+m))<T4$ for some point (x,y) where C(x,y) is the intensity (C) at (x,y), n and m are integers corresponding to neighboring points, and T2 and T3 are threshold values).

At block 702, the example corner determiner 206 identifies all the example text lines 828, 829 in the region based on the vertical dark-to-bright transition points. In some examples, the example corner determiner 206 uses a Hough transform to identify the example text lines 828, 829. At block 704, the example corner determiner 206 eliminates all the example error text lines 829 outside a threshold orientation of the example target object 802. As described above, the orientation of the target object 802 is determined based on the location of the matched landmark. For example, the orientation may be based on the bottom edge of the matched landmark, the top edge of the matched landmark, or an average of the top and bottom edges. The example error text lines 829 are lines that do not fall within the threshold orientation of the example target object 802 (e.g., within a threshold angle of the angle of the matched template landmark).

At block 706, the example corner determiner 206 identifies the example bottom text line 830 based on the text line (e.g., of the example text lines 828) closest to the bottom of the image 800. At block 708, the example corner determiner 206 determines the example third corner 832 based on an intersection between the example left side edge 822 and the example bottom text line 830. At block 710, the example corner determiner 206 determines the example fourth corner 834 based on an intersection between the example right side edge 826 and the example bottom text line 830. As illustrated in example image 800 of FIG. 8F, the example corners 816, 824, 832, 834 represent the region of interest of the example target object 802. In some examples, the region of interest corresponds to the corners of the example target object 802. In some examples, the region of interest corresponds to a subset of the example target object 802. By the determination of the corners (e.g., the four example corners 816, 824, 832, 834), which are practically impossible to determine directly, the example target object 802 can be separated from the background and be rectified onto an image as if the image were scanned instead of being imaged by a camera, thereby leading to more accurate OCR extraction.

Figure 9:
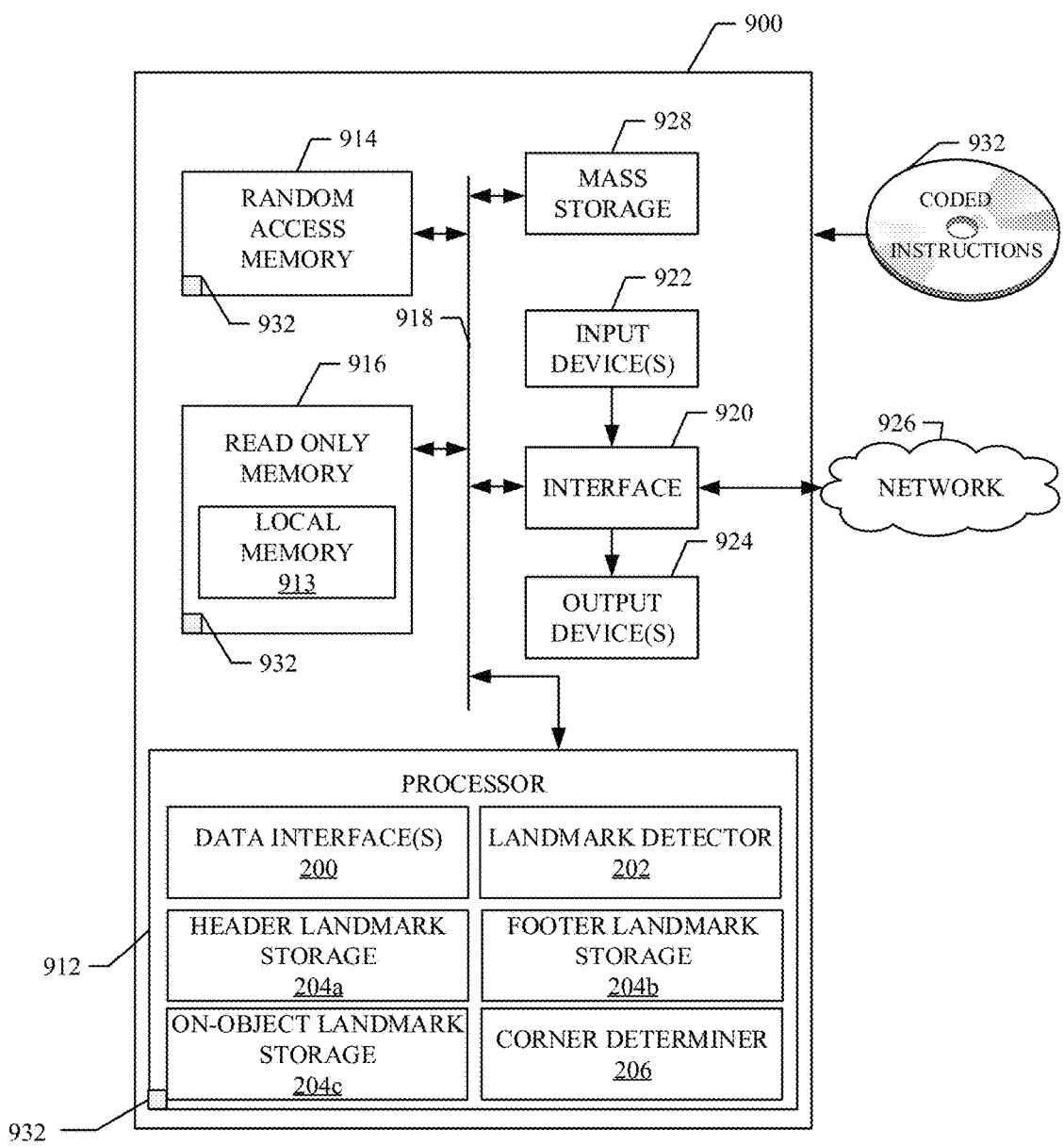
FIG. 9 is a block diagram of an example processor platform that may be utilized to execute the example instructions of FIGS. 3-7 to implement the example dimension determiner of FIG. 1 and/or FIG. 2.

FIG. 9 is a block diagram of an example processor platform 900 capable of executing the instructions of FIGS. 4A, 4B, and 5 to implement the example dimension determiner 106 of FIG. 2. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by integrated circuits, logic circuits, microprocessors or controllers from any desired family or manufacturer.

The processor 912 of the illustrated example includes the example memory 212 (e.g., a cache). The example processor 912 of FIG. 9 executes the instructions of FIGS. 4A, 4B, and 5 to implement the example data interface(s) 200, the example landmark detector 202, the example header landmark storage 204a, the example footer landmark storage 204b, the example on-object landmark storage 204c, and/or the example corner determiner 206 of FIG. 2 to implement the example dimension determiner 106 (FIGS. 1 and 2). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 4A, 4B, and 5 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus, and articles of manufacture may be used determine the dimensions of a region of interest of a target object and the class of the target object from an image using target object landmarks to increase the accuracy and durability of text recognition techniques. Prior techniques of processing images for text recognition techniques include determining the corners of the target object. However, such prior methods have difficulty and/or are not able to identify corners when (a) the background of the image includes boundary-like elements, (b) the background is substantially similar to the target object, (c) the target object is crumpled or misshaped, (d) shadows are present in the image, (e) prospective distortion is present, and/or (f) the corner(s) of the target object are not within the image. Examples disclosed herein determine a region of interest of a target object and the class of the target object based on identifying and locating a landmark in the target object and text in the target object. Identifying and locating the region of interest based on the landmark/text of the target object alleviates the problems that arise by conventional techniques of directly locating the corners of the target object because the corners might not be imaged, well formed, or distinguishable from the background. Examples disclosed herein alleviate such problems that arise by conventional techniques of indirectly locating corners because the landmark provides a reference framework that significantly eliminates the fast edges that often appear in the background. Furthermore, the landmark may indicate a class of the target object regardless of if the landmark is text or graphical while OCR techniques cannot determine the class of the target object when the landmark is graphic. The alleviations and the class determination make the disclosed method a much more robust way to construct a rectified image and to determine the class of the target object, thereby proving a more robust wat to extract textual information from the image of the target object.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
  a landmark detector implemented by at least one processor to identify a landmark in an image based on a match between the landmark and a template landmark; and
  a corner determiner implemented by at least one processor to:
    generate a first side search area based on a first template edge of the template landmark, the first side search area being a first region including a first landmark edge of the landmark in the image;
    identify the first landmark edge by analyzing first transition points in the first side search area;
    generate a second side search area based on a second template edge of the template landmark, the second side search area being a second region including a second landmark edge of the landmark; and
    identify the second landmark edge by analyzing second transition points in the second side search area; and
    identify a region of interest of the image based on the first landmark edge and the second landmark edge, the region of interest corresponding to text printed in the image.

2. The apparatus of claim 1, wherein the landmark detector is to match the landmark to the template landmark by comparing the landmark to a plurality of template landmarks.

3. The apparatus of claim 1, wherein the corner determiner is to transform a template landmark size and a template landmark orientation of the template landmark to match a landmark size and a landmark orientation of the landmark.

4. The apparatus of claim 1, wherein the corner determiner is to:
  determine a first corner of the region of interest based on a first intersection between a third template edge of the template landmark and the first landmark edge; and
  determine a second corner of the region of interest based on a second intersection between the third template edge of the template landmark and the second landmark edge; and
  determine a first side edge of the region of interest and a second side edge of the region of interest, the first side edge corresponding to the first landmark edge and the second side edge corresponding to the second landmark edge.

5. The apparatus of claim 4, wherein the first side search area and the second side search area are limited in direction and area.

6. The apparatus of claim 4, wherein the corner determiner is to determine text lines within a third region, the third region corresponding to the third template edge of the landmark, the first side edge, the second side edge, and a bottom image line corresponding to a bottom of the image.

7. The apparatus of claim 6, wherein the corner determiner is to:
determine a third corner of the region of interest based on a third intersection between the first side edge and a text line closest to the bottom image line; and
determine a fourth corner of the region of interest based on a fourth intersection between the second side edge and the text line closest to the bottom image line.

8. The apparatus of claim 7, wherein the first, second, third, and fourth corners of the region of interest improve an accuracy of text recognition.

9. The apparatus of claim 1, wherein the landmark detector is to determine a class of an object included in the image based on the matched template landmark, the region of interest included in the object, the class including at least one of a company or a store.

10. An apparatus comprising:
first means for identifying a landmark in an image based on a match between the landmark and a template landmark; and
second means for:
generating a first side search area based on a first template edge of the template landmark, the first side search area being a first region including a first landmark edge of the landmark in the image;
identifying the first landmark edge by analyzing first transition points in the first side search area;
generating a second side search area based on a second template edge of the template landmark, the second side search area being a second region including a second landmark edge of the landmark; and
identifying the second landmark edge by analyzing second transition points in the second side search area; and
identifying a region of interest of the image based on the first landmark edge and the second landmark edge, the region of interest corresponding to text printed in the image.

11. The apparatus of claim 10, wherein the first means is to match the landmark to the template landmark by comparing the landmark to a plurality of template landmarks.

12. The apparatus of claim 10, wherein the second means is to transform a template landmark size and a template landmark orientation of the template landmark to match a landmark size and a landmark orientation of the landmark.

13. The apparatus of claim 10, wherein the second means is to:
determine a first corner of the region of interest based on a first intersection between a third template edge of the template landmark and the first landmark edge; and
determine a second corner of the region of interest based on a second intersection between the third template edge of the template landmark and the second landmark edge; and
determine a first side edge of the region of interest and a second side edge of the region of interest, the first side edge corresponding to the first landmark edge and the second side edge corresponding to the second landmark edge.

14. The apparatus of claim 13, wherein the second means is to determine text lines within a third region, the third region corresponding to the third template edge of the landmark, the first side edge, the second side edge, and a bottom image line corresponding to a bottom of the image.

15. The apparatus of claim 14, wherein the second means is to:
determine a third corner of the region of interest based on a third intersection between the first side edge and a text line closest to the bottom image line; and
determine a fourth corner of the region of interest based on a fourth intersection between the second side edge and the text line closest to the bottom image line.

16. The apparatus of claim 10, wherein the first means is to determine a class of an object included in the image based on the matched template landmark, the object including the region of interest, the class including at least one of a company or store.

17. A tangible computer readable storage medium comprising instructions which, when executed, cause a processor to at least:
identify a landmark in an image based on a match between the landmark and a template landmark;
determine a first landmark edge by analyzing transition points in a first side search area corresponding to a first edge of the template landmark;
determine a second landmark edge by analyzing second transition points in a second side search area corresponding to a second edge of the template landmark;
determine a first side edge corresponding to the first landmark edge and a second side edge corresponding to the second landmark edge;
identify text lines within a region defined by the first side edge and the second side edge; and
identify a region of interest based on the text lines, the region of interest corresponding to text printed in the image.

18. The tangible computer readable storage medium of claim 17, wherein the instructions cause the processor to:
determine a first corner of the region of interest based on a first intersection between a third edge of the template landmark and the first landmark edge; and
determine a second corner of the region of interest based on a second intersection between the third edge of the template landmark and the second landmark edge.

19. The tangible computer readable storage medium of claim 18, wherein the first edge is an edge of an object included in the image, the object including the region of interest, and wherein the instructions cause the processor to determine the first side edge of the object by:
extending the first side edge to an image line corresponding to an end of the image;
generating a plurality of lines between the first corner and a bottom image line within a threshold range of intersection; and
selecting the first side edge based on transition point counts for the plurality of lines.

20. The tangible computer readable storage medium of claim 18, wherein the instructions cause the processor to identify the text lines based on dark-to-bright transition points.

* * * * *